(12) United States Patent
Culver et al.

(10) Patent No.: US 6,430,328 B1
(45) Date of Patent: Aug. 6, 2002

(54) OPTICAL SWITCH

(76) Inventors: William H. Culver, 4253 Fordham Rd., Washington, DC (US) 20016; Donald Cronin Schmadel, Jr., 7201 Princeton Ave., Apt., 10, College Park, MD (US) 20740

(*) Notice: Subject to any disclaimer, the term of this patent is extended or adjusted under 35 U.S.C. 154(b) by 0 days.

(21) Appl. No.: 09/689,694

(22) Filed: Oct. 13, 2000

(51) Int. Cl.$^7$ .................................................. G02B 6/26
(52) U.S. Cl. .......................................... 385/16; 385/18
(58) Field of Search ...................................... 385/16–24

(56) References Cited

U.S. PATENT DOCUMENTS

| | | |
|---|---|---|
| 3,299,368 A | 1/1967 | Klebba |
| 4,404,402 A | 9/1983 | Ladner et al. |
| 4,498,730 A | 2/1985 | Tanaka et al. |
| 5,506,919 A | 4/1996 | Roberts .......................... 385/1 |
| 5,943,155 A | 8/1999 | Goossen ...................... 359/247 |
| 6,020,986 A | 2/2000 | Ball |
| 6,075,424 A | 6/2000 | Hampel et al. ............... 333/161 |
| 6,268,952 B1 | 7/2001 | Godil et al. .................. 359/291 |

OTHER PUBLICATIONS

Takeuchi et al. "Wavefront Distortion Measurement of a SR Extraction Mirror for the Beam Profile Monitor Using Shack–Hartmann Method", 1998 IEEE, pp. 859–861.*

Microelectronic structures and MEMS for Optical Processing III, Sep. 1997, pp. 1–4.

Feiling Wang, Thin Ferroelectric Interferometer for Spatial Light Modulations, Nov. 10, 1998, pp. 7490–7495.

David J. Bishop, Optical MEMS for Lightwave Networks, Nov. 8, 2000.

J. U. Kim & M. S. Park, Silicon Modulator Based on Mechanically–Active Anti–Reflection Switch for Fiber–in–the–loop Application (Mechanical Anti–Reflection Switch), pp. 1–3.

James A. Thomas et al., Programmable diffractive optical element using a Multichannel Lanthanum–modified lead Zirconate Titanate Phase Modulator, Jul. 1, 1995, vol. 20, Optics Letters, pp. 1510–1512.

Peter Fairley, "The Microphotonics Revolution", Jul./Aug. 2000, Technology Review and Optics Letters Article.

* cited by examiner

*Primary Examiner*—Phan T. H. Palmer
(74) *Attorney, Agent, or Firm*—Staas & Halsey LLP

(57) ABSTRACT

The present invention is a system that includes phase spatial light modulators as optical switching elements in an optical switching system. One or more input light beams are deflected by one or more input optical deflectors to a mirror and then to one or more output optical deflectors. Each deflector is a phase spatial modulator which changes the direction of the light beam by changing the phase of the beam wave front. The wave front is two dimensionally subdivided into pixels and pixel reflectors are used displace portions of the wave front in a direction generally perpendicular to the beam axis and relative to each other. Beam splitters, lenses, decoders and controllers provide the ability to cross connect or reroute beams and route packets.

40 Claims, 17 Drawing Sheets

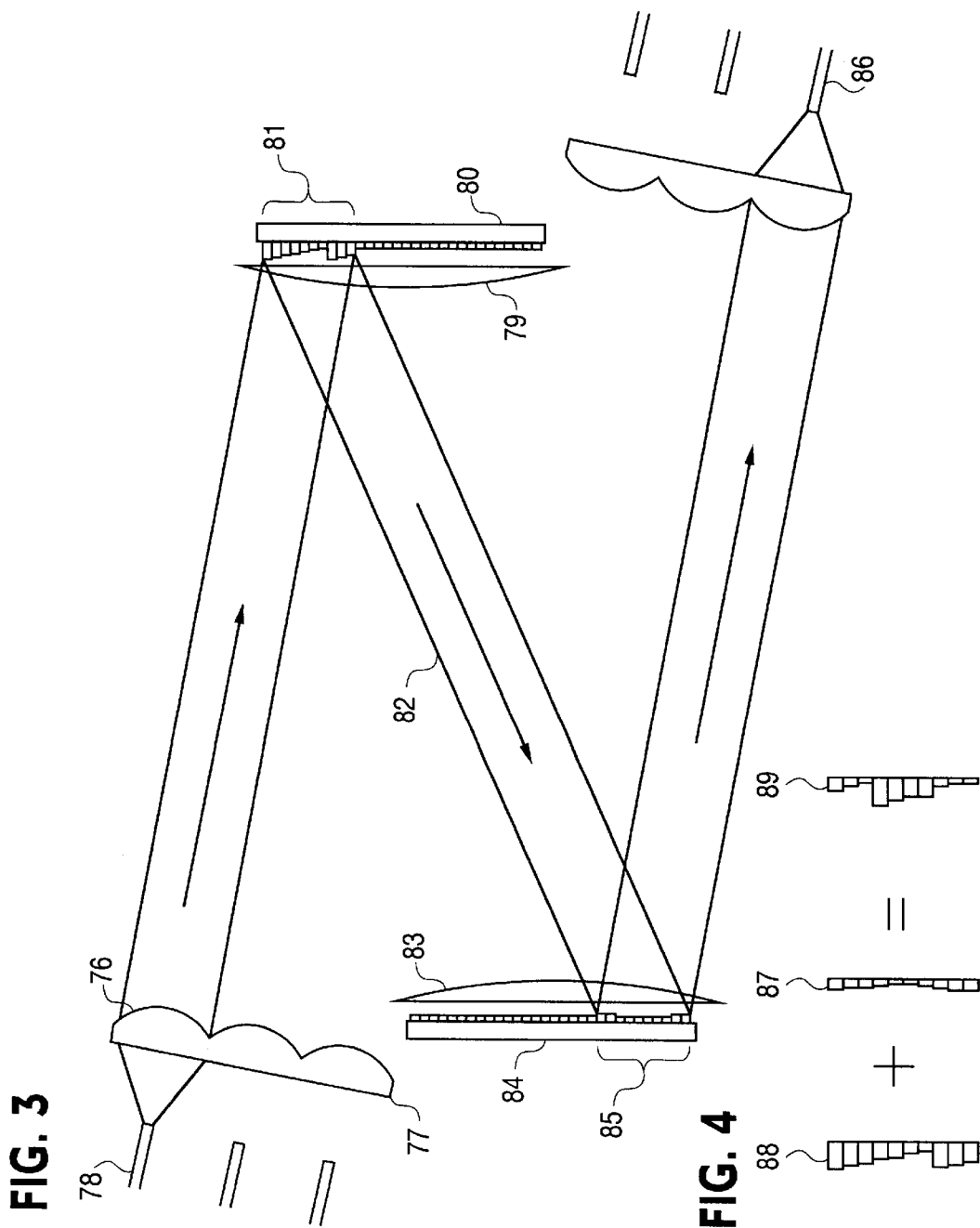

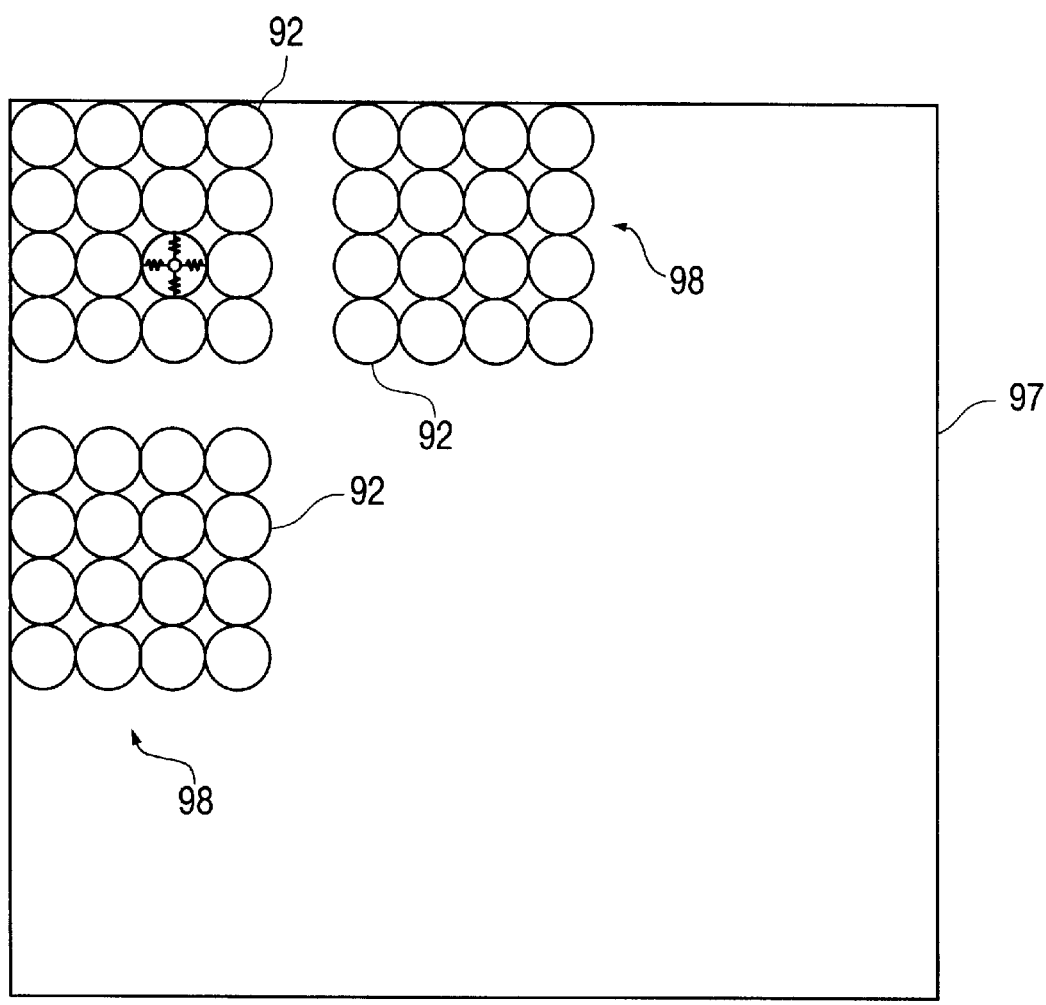

$\delta$ = relative displacement of adjacent mirror reflectors
$\lambda$ = wavelength of light
L = optical path distance between input and output SLMs
d = pixel width
D = width of output SLM
n = number of pixels across single deflector region

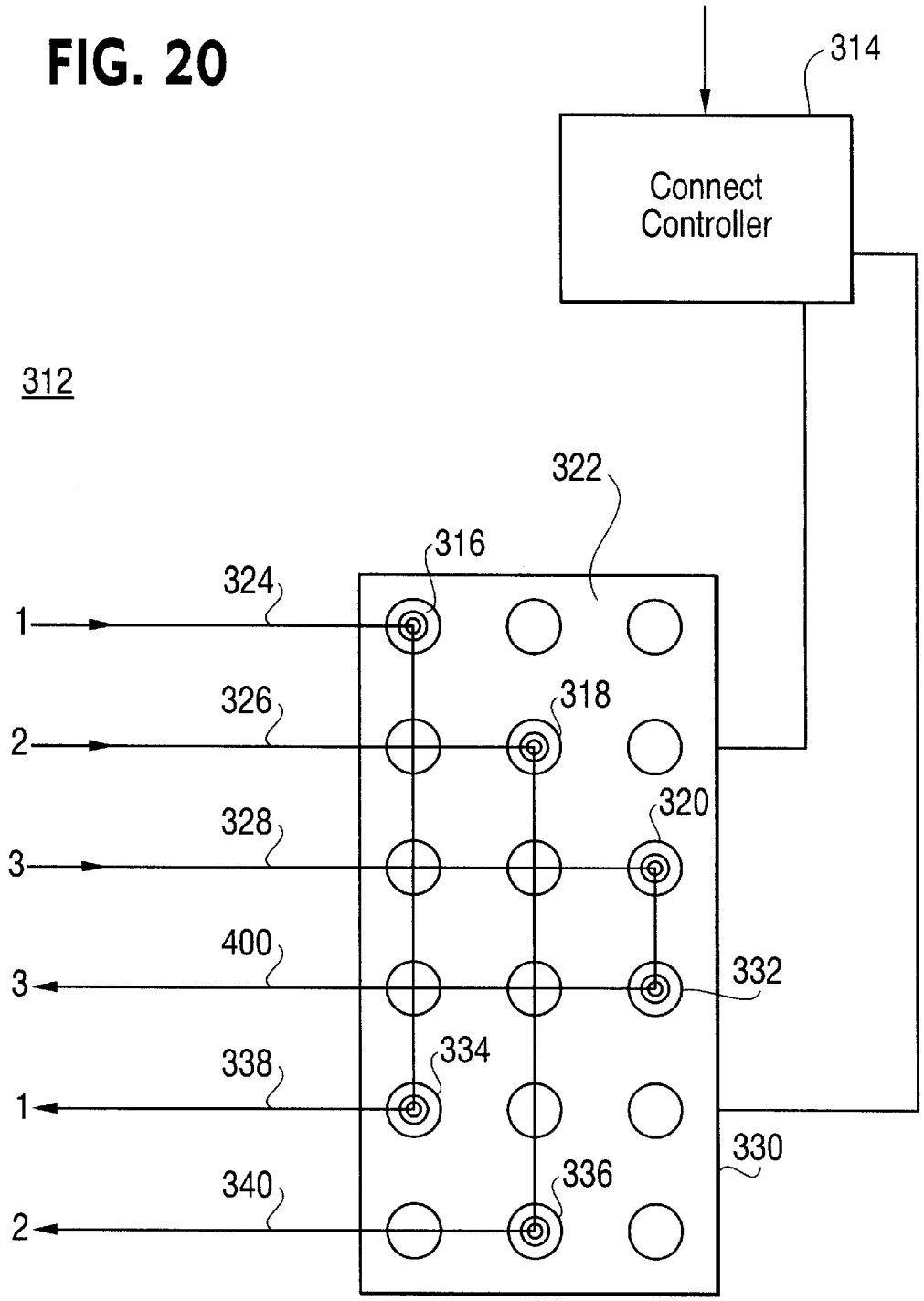

OPTICAL SWITCH

BACKGROUND OF THE INVENTION

1. Field of the Invention

The present invention is directed to an optical switch and, more particularly, to a switch that switches an optical beam from an input port to an output port without converting the signal to electrical form by the use of one or more optical phase changing spatial light modulators (SLMs).

2. Description of the Related Art

Today's packet switched communication networks, such as the Internet, are implemented using fiber optic technology where a modulated laser beam is transmitted down an optical fiber or glass wave guide. Switching between fibers within the network is typically performed by converting the light signal into an electrical signal, performing the switching function on the electrical signal and then converting the electrical signal into a light signal. These conversion operations are slow and expensive.

What is needed is a switch that switches the light beam between input and output fibers optically directly without converting the signal into electrical form.

A direction of a laser beam can be changed via a number of different techniques, including reflecting the beam from a mirror that can be rotated. However, rotating a mirror is slow slower than desired for many switching operations.

What is needed is an optical switch that will switch beam directions faster.

SUMMARY OF THE INVENTION

It is an object of the present invention to perform optical switching for an optical network by changing the relative-phase of individual portions of the cross section of a wave front of a beam.

It is another object of the present invention to use one or more phase spatial light modulators (SLMs) to perform optical switching.

It is another object of the present invention to use phase spatial light modulators that include an array of phase shifting elements in such a manner that each of the phase shifting elements moves a maximum distance of about one half of the wavelength of light.

It is an additional object of the present invention to use phase spatial light modulators that include an array of phase shifting elements in such a manner that the area of the phase shifting mirror or element is smaller than the cross section of the portion of the beam of light the element is modulating.

It is also an object of the present invention to provide optical routers and cross connect switches which perform switching of one or more optical beams between optical fibers using phase spatial light modulation.

The above objects can be attained by a system that includes one or more phase spatial light modulators as optical switching elements in an optical switching system. One or more input light beams are deflected by one or more input optical deflectors. The beam can be further deflected by one or more output optical deflectors. Each deflector changes the direction of the light beam by changing the phase of the beam wave front by displacing pixel reflectors in a direction essentially perpendicular to the beam axis and relative to each other.

These together with other objects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIGS. 3 and 4 show how a beam is defected between SLMs and corrected for divergence.

FIGS. 5A and 5B shows pixel reflectors of an SLM.

FIG. 20 depicts a beam cross connect.

DESCRIPTION OF THE PREFERRED EMBODIMENTS

The present invention optically switches a signal carrying light beam, such as a laser beam, between input and outputs, such as input and output optical fibers, by changing the direction of an optical beam, such as a data carrying laser beam, by independently changing a phase of individual sections of the beam wave front using a phase spatial light modulator (SLM). This change in direction can be accomplished by a transmissive SLM, such as those available from Kopin Corporation of Taunton, Mass. or Coretech of Burlington, Mass. or, more preferably by a reflective SLM., such as those available from MEMS Optical, Inc. of Huntsville, Ala. or Boulder Nonlinear of Boulder, Colo. The direction of each light beam is altered by varying the relative phase shift imparted to successive adjoining pixels within the beam. The angular deviation of each light beam is equal to the relative optical phase shift imparted to adjacent pixels divided by the pitch of the pixel array measured in wavelengths of the light. The advantage of using an array of small phase shifting pixels is that the pixels can be brought to the correct position for the desired deflection angle much more rapidly than other types of devices and that no pixel of the SLM needs to advance the phase of the wave front by more than one wavelength of the light.

Figure 1:
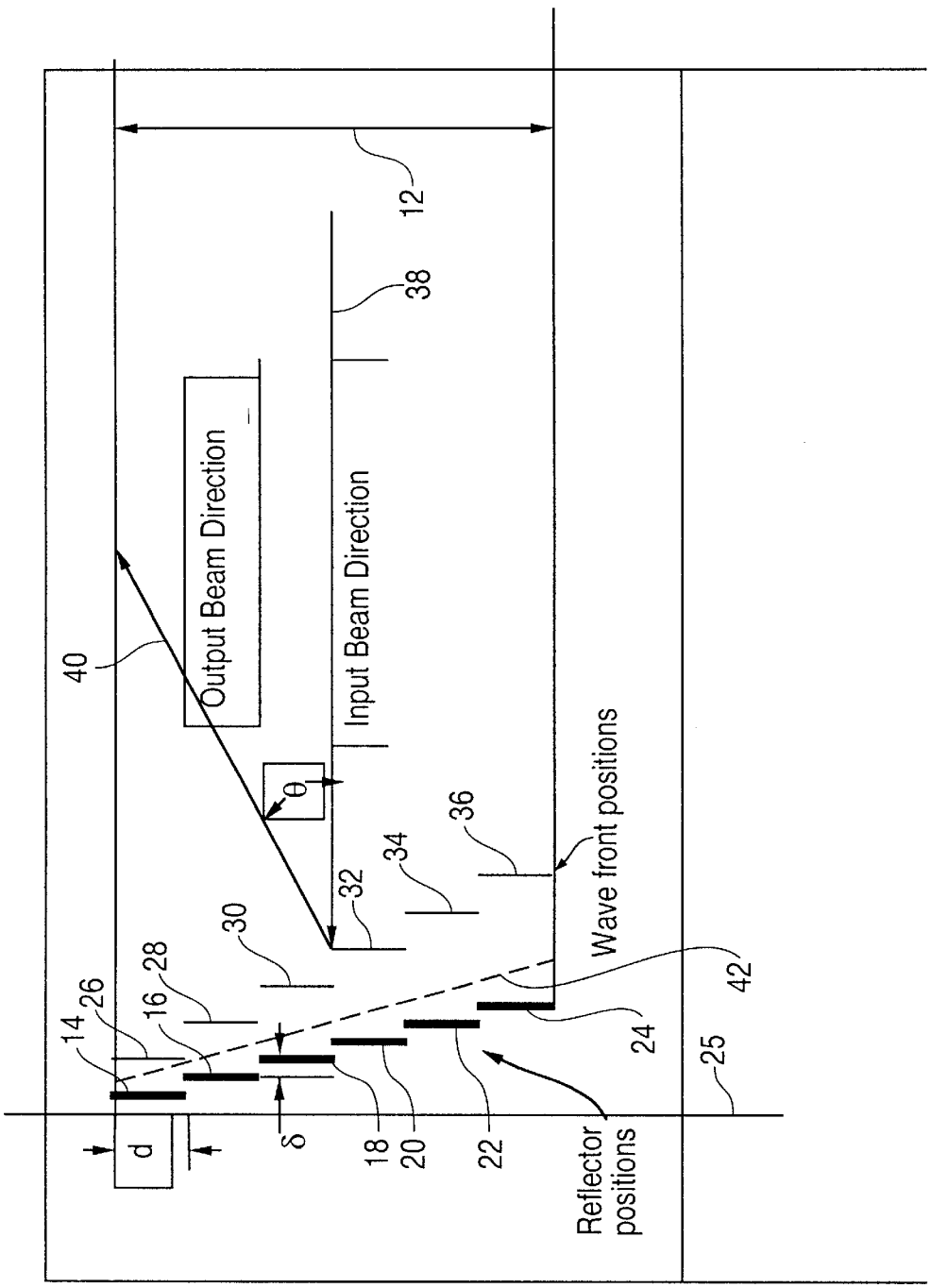
FIG. 1 depicts the operations of an SLM according to the present invention.

A portion of a reflective SLM, as depicted in cross section in FIG. 1, changes the phase of a beam 12 wave front by changing the positions of small plate shaped reflectors 14–24 in the path of the beam 12. The beam 12 is "divided" into or by a series of pixels that correspond to these reflectors. Each pixel or pixel reflector has width d and is positioned a varying distance from a reference position 25. Each pixel reflector is moved in a direction that is generally perpendicular the reflective surface of the element. When successive pixel reflectors are advanced δ relative to the previous pixel reflector, such as depicted for the pixel reflectors 16 and 18, successive wave front elements (portions of the incoming beam) 26–36 will be relatively advanced or displaced by 2δ. As a result, the advancement of the wave front 36 for the last pixel 24 is n*2δ, where n is the number of pixels. This results in a beam deflection angle of θ=arc tan(2δ/d), such that the incoming beam direction 38 is reflected in an outgoing direction 40 at an angle of θ. The phase change can be made to increase linearly across the beam, thus causing a deflection as shown in FIG. 1. The effect of the wave front displacements caused by moving the reflectors is the creation of a virtual mirror 42 depicted by the dashed line in FIG. 1.

When the reflector displacement 60 of successive pixels, for example pixels 62 (see FIG. 2) cumulatively exceeds $\lambda/2$, where $\lambda$ is the wavelength of the light, the displacement for the nth element, such as pixel 64, is reduced by $\lambda/2$, that is to nδ modulo($\lambda/2$). nδ modulo($\lambda/2$) is the remainder when nδ is divided by $\lambda/2$, thus no mirror displacement need be greater than $\lambda/2$. Since the light beam is from a laser it is essentially monochromatic and has a phase angle which is periodic in distance $\lambda$, the relative phase angle of the reflected light between pixel 62 and pixel 64 is equivalent to δ. In this figure the incoming beam 66 arrives via direction 68 and results in an outgoing beam 70 being reflected in an exit direction 72 and again creating a virtual mirror 74 depicted by the dashed line in FIG. 2. That is, with this approach a pixel reflector must be moved at most the $\lambda/2$ distance which is a fraction of the distance or virtual displacement VD that an edge of a rotating mirror is moved to produce the same angle of reflection. VD indicates the displacement of a mirror that rotates or pivots around it's axial center which is the place where the beam line 68 hits the virtual mirror 74 and reflects as beam line 72. If the virtual mirror 74 pivots around an end, rather than around the center, the displacement will be 2*VD. As a result, the angle of the beam can be changed much faster using an SLM than when using a rotating mirror. Additionally, the reflector elements of an SLM are very small requiring that a very small mass be moved. The mass of the reflectors may be much smaller than that of a stiff relatively massive rotating mirror and for this additional reason, the switching of the beam is faster.

The virtual mirror 74 has the same resolving power as a real plane mirror of the same diameter. A separate resolvable direction requires a motion of one side of the mirror with respect to the other side of $\lambda/2$. Thus for a deflector that is n pixels wide, δ should be chosen to be approximately $\lambda/(2*n)$ depending on the application.

Figure 2:
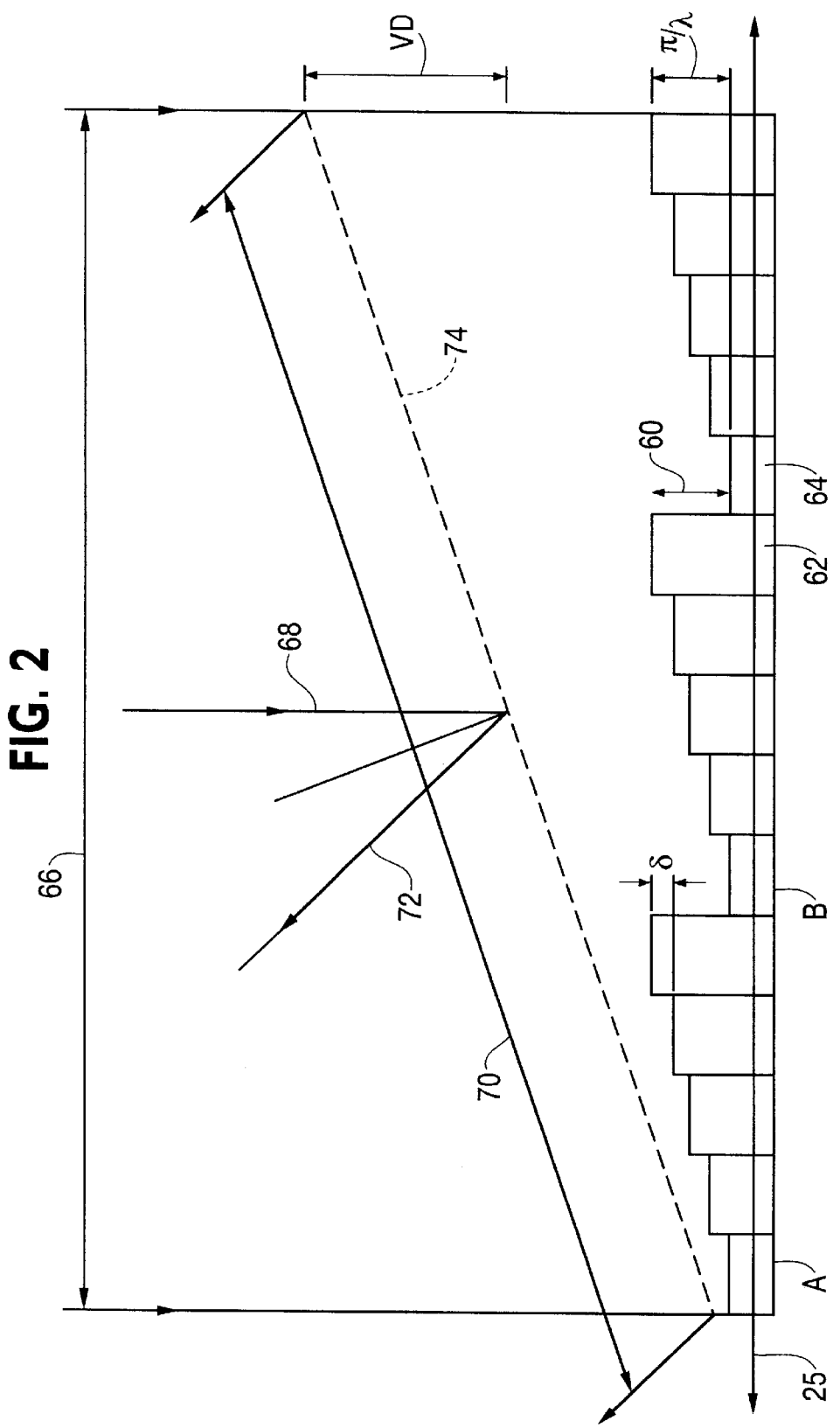
FIG. 2 depicts the changing of the direction of a beam using SLM pixels.

Note that FIG. 2 is somewhat of a simplification of the actual relationship between successive pixels as the relative movement of a pixel crosses the $\lambda/2$ reset threshold. FIG. 2 could be seen to imply that when the modulo($\lambda/2$) shift is performed that a successive pixel position always returns to the same base level set above the reference level 25. In fact that could be the case, but most of the time it will not return to the base level. The reflector position will return to the base level only when δ is a sub-multiple of $\lambda/2$. In practice pixels A, B and 64 do not typically return to the same level. For instance pixel B might return to half the level of pixel A and pixel 64 might return to the base level. However, all increments between successive pixels do remain the same.

Although it is not necessary to advance any pixel mirror more that a distance of $\lambda/2$ the deflector will deflect the beam equally well if full advantage is not taken of this principle. For instance successive mirrors might be advanced by 0.0, 0.2, 0.4, 0.6, 0.8, 0.5, 0.7, etc. wavelengths. In this case the mirror was moved a distance equal to 0.8 wavelengths. The mirrors can also be allowed to advance more than $\lambda/2$, generally in integral multiples. The advantage of moving the mirror no more than $\lambda/2$ is that it will allow higher speed switching but not taking full advantage of the feature does not violate the spirit of this invention. Any decrease of motion or wave front phase modulation allowed by dividing up the deflector into separate pixels is within the spirit of this invention.

The pixel reflector displacement structure depicted in FIGS. 1 and 2 is repeated in the dimension perpendicular to the diagrams allowing the beam to be steered in two dimensions.

A transmissive SLM changes a direction of the beam by changing the phase of the wave front of the beam passing through the pixels of the SLM by retarding the wave front elements by a displacement equivalent to that of the advancement displacement of the wave front elements caused by the reflective SLM. This advancement need not be greater than $\lambda$.

FIG. 3 is a 2 dimensional depiction of another configuration of the invention. This particular illustrative example switches a 3 by 3, 2 dimensional array of optical fibers. Referring to FIG. 3, lens 76 of lens array 77 collimates the light from fiber 78. This light then passes through an optional field lens 79 and strikes a reflective SLM 80 in the region of n×n pixel elements 81 corresponding to fiber channel 78. An SLM control adjusts and maintains the relative phase modulo $\lambda$ (as discussed earlier) of n×n elements 81 to direct the resulting reflected collimated beam 82 back through field lens 79, through another optional field lens 83 and onto reflective SLM 84 in the region of any of the other 9 groups of n×n elements corresponding, such as group 85 forming an output deflector, to one of 9 output fiber channels. In FIG. 3 SLM 84 then directs the beam 82 back through field lens 83 to fiber channel 86 which corresponds to SLM region 85.

The optional field lenses 79 and 83 serve to aim the diffraction pattern of each SLM element towards the center of the other SLM so as to reduce power loss particularly from channels near the periphery of the input and output arrays. As such the lenses 79 and 83 should have a focal length of twice the separation between SLM 79 and 83. For transmissive SLM configurations the focal length should equal the separation between SLMs since the beams pass through each lens only once.

From a consideration of the light propagation modes for square arrays, n squared equals the total number of channels and the total number of SLM elements equals n squared times the total number of channels. These exact relations are not required. The invention only requires enough elements to sufficiently confine and deflect each beam into the intended channel so that any portion of the beam which strikes any other elements results in radiant energy in other channels which produces no more than acceptable crosstalk.

The invention also provides additional phase adjustments to be added by the SLM elements to further confine the beams and reduce diffraction effects. Consider, for example, that even after collimation each beam may continue to diverge due to diffraction. For example, the beam will continue to diverge as it is reflected by regions 81 and 85. The invention further adjusts and maintains each of the n×n elements to provide a focusing effect at SLM 80. FIG. 4 shows this additional set of phase corrections 87 which when added to the original phases 88 used for deflection produce the result 89 which is reduced to modulo($\lambda/2$) as discussed earlier. This focusing correction can be applied to all deflecting regions on SLMs 80 and 84. Further, the invention provides that additional phases can be added or subtracted by the SLMs to correct for other errors such as in the lens arrays, such discussed below.

Figure 5A:
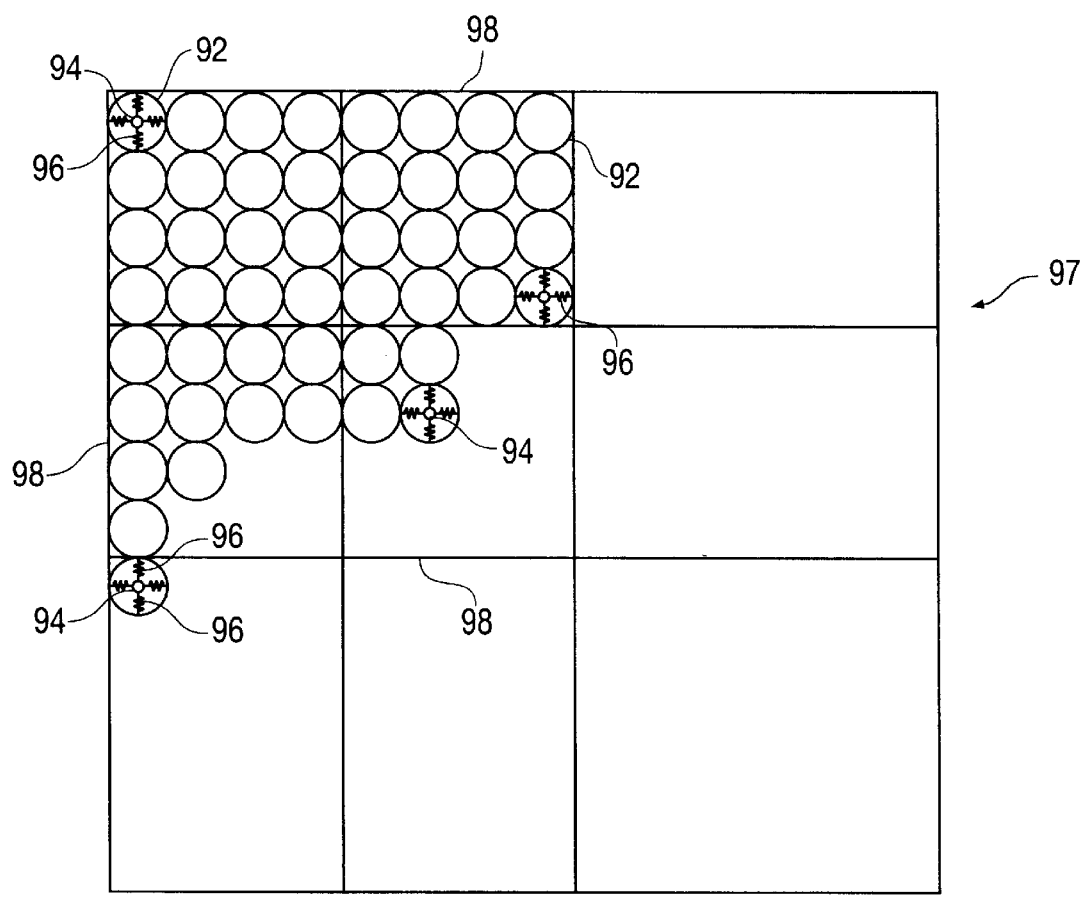

The pixel reflectors can be manufactured in a planar array of mirror elements 92 as depicted in FIG. 5A where each element 92 or pixel reflector includes a mirror 94 and springs 96. FIG. 5A shows a close packed array of pixels 92 of an SLM 97 divided into individual beam deflection regions 98. FIG. 5B shows the pixels 92 separated into regions 98 on an SLM 97.

Figure 6A:
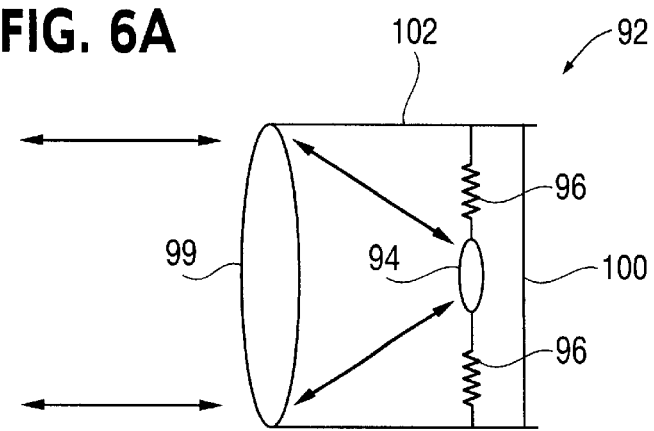
FIGS. 6A and 6B show embodiment of a pixel.

Each element 92 may also include a lens 99 that covers the surface of the element and focuses light onto the mirror 94 where it reflected back through the lens 99, as shown in FIG. 6A. The position or displacement of each mirror 94 above the back plate or base 100 of the cavity 102 is controlled by a voltage applied between the reflector 94 and the base plate 100. Lenses 99 of contiguous pixels can form a continuous array/plane (see FIGS. 5A and 5B) thus collecting more of the incident light which is focused on to the mirror which has a smaller area. The small size of the mirror allows it to be moved more rapidly than a larger mirror.

Figure 6B:
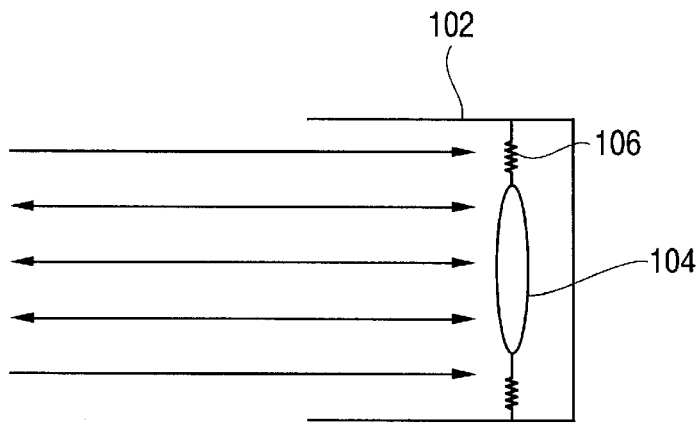

In another embodiment as shown in FIG. 6B, the reflector 104 is made larger that the reflector 94 allowing the lens 99 to be eliminated and increasing the useful solid angle into which the beam can be deflected compared to the pixel with the lens.

The use of a lens array with the pixels allows the use of smaller mirrors, which allows faster switching operation than the use of bare mirrors that have the same light collection efficiency. The smaller mirrors can be made less massive than larger mirrors by a proportion greater than their ratio of the areas because the smaller mirrors also require less material strength to maintain flatness.

If the position of the mirrors (94/104) is controlled to 8 bits the reflected wave front will be flat to approximately one part in 64, sufficient to maintain and precisely direct a diffraction limited beam for a 4000 port crossbar or cross connect type switch.

Figure 7:
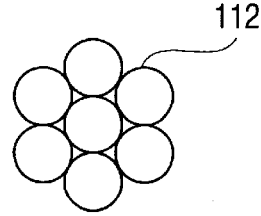
FIG. 7 shows an arrangement of pixels of a deflector.

In the above discussion the input, output and deflector arrays have been described as contiguous close packed rectangular arrays of pixels, however, other arrangements can be used such as the hexagon depicted in FIG. 7. The pixels may, of course, be arranged in a rectangular grid as previously discussed or in another convenient pattern.

Figure 8:
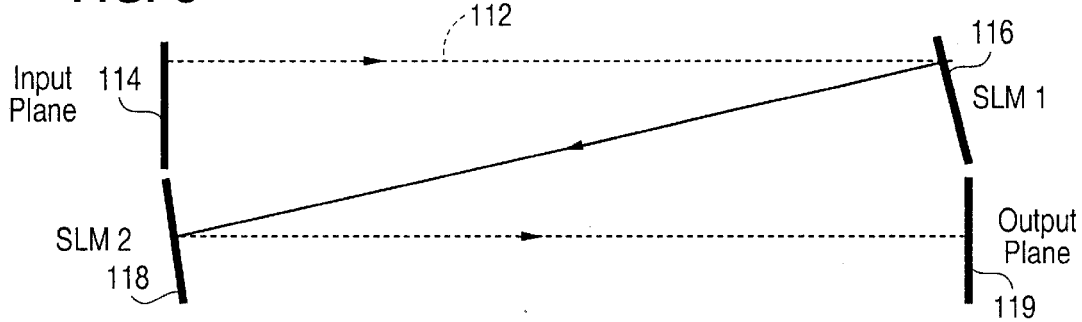
FIGS. 8–14 depict beam reflecting embodiments.

FIG. 8 depicts a folded path cavity embodiment in which input an beam(s) 112 from an input plane 114 is deflected by a first SLM 116 to a second SLM 118 which deflects the beam to an output channel on the output plane 119. A cross connect cavity design capable of switching 900 channels (a 30×30 array) using 30 micron pixels results in a cavity 4 cm high, 12 cm wide and 24 cm long. A similar switch using 20 micron pixels would be only 2.5 cm high, 7.5 cm wide and 11 cm long.

Figure 9:
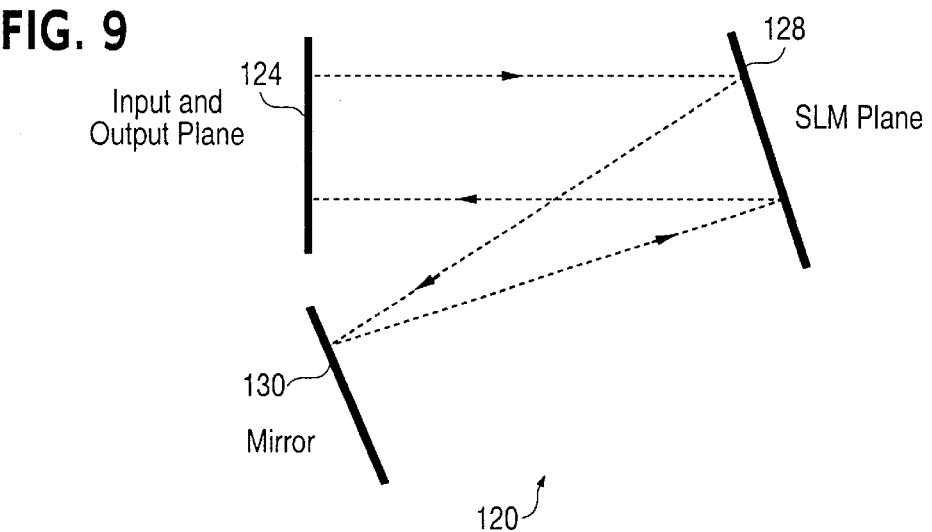

FIG. 9 depicts a folded light path cavity 120 in which an input beam from an input fiber of an array 124 of fiber input channels passes through an input lens of a lens array and is incident on an SLM input beam deflector within an array 128 of input beam deflectors. The beam is directed to a mirror 130 where it is reflected onto an output deflector of the array 128. The output beam is deflected to an output lens of the array 124 where it is focused into an output fiber of the array 124.

Figure 10:
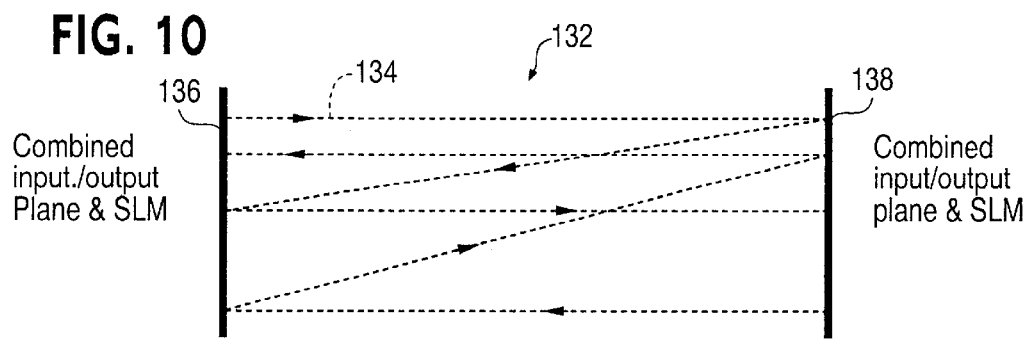

FIG. 10 depicts another embodiment in which each end of the cavity 132 includes a plane that functions as an input plane, an SLM deflector and an output plane such that a beam 134 entering on the left via plane 136 is deflected by a deflector on plane 138 back to a deflector on plane 136 and then back to plane 138 where it is output. This configuration allows the inputs to be on the opposite side of the cavity 132 from the outputs.

Figure 11:
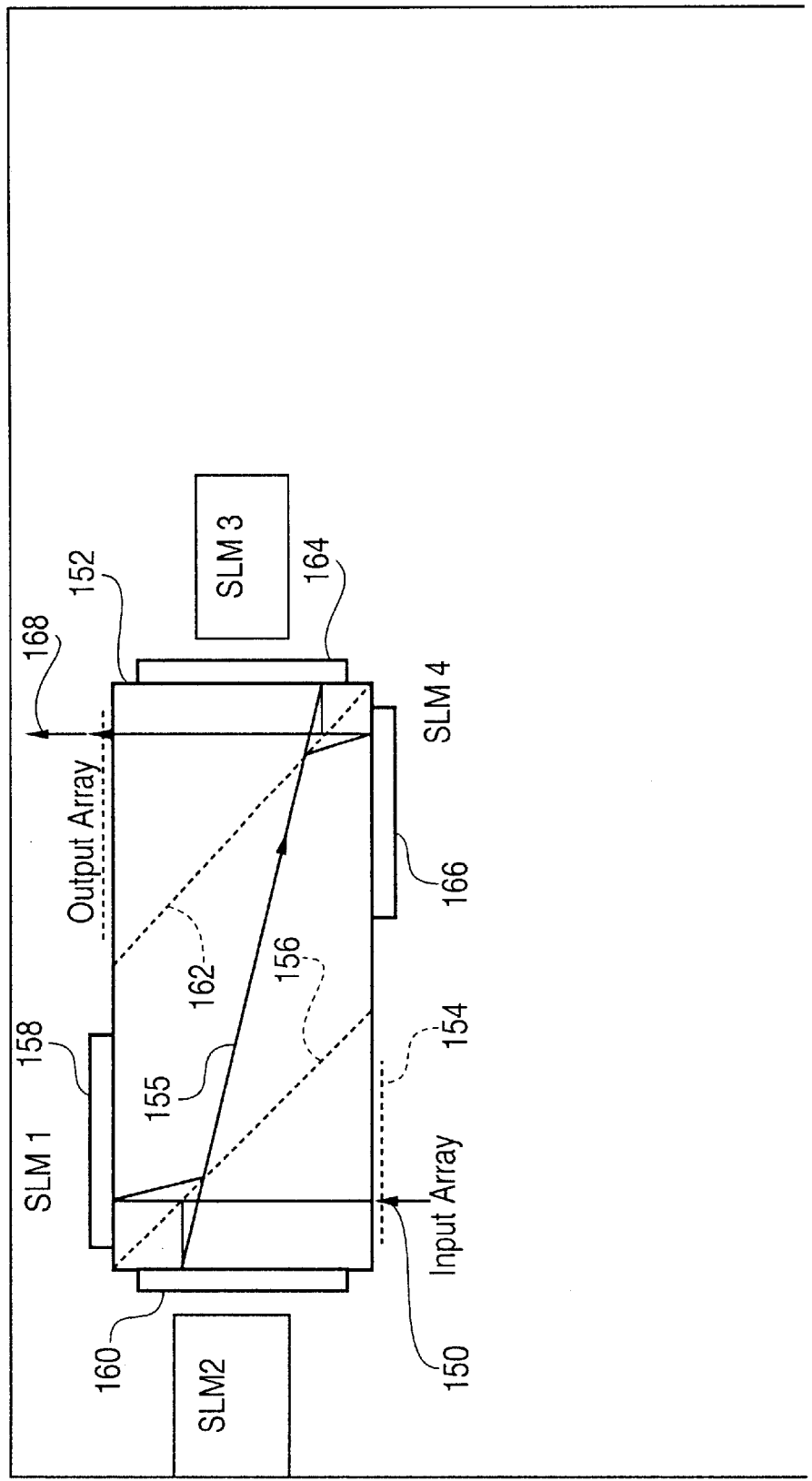

FIG. 11 shows another configuration in which 4 SLMs are used. SLM 1 (158) and SLM 2 (160) are configured in a Michelson interferometer as are SLM 3 (164) and SLM 4 (166). An input beam 150, from an input array 154, is split into two equal intensity beams by beam splitter 156. Each of these beams is incident on beam deflectors on the SLMs 1 and 2. The beam incident on SLM 2 is deflected in direction 155. The beam incident on SLM 1 is deflected so that it is incident on beam splitter 156 coincident with the beam from SLM 2. By proper adjustment of the phases of the individual pixels, which is within the ordinary skill in the art of Michelson of interferometers, the relative phase of these two beams is controlled so that when they interfere on beam splitter 156 all of the beam intensity is directed in the direction of beam 155 where it is split into two equal intensity beams by beam splitter 162. When these two equal intensity beams are incident on the same region of beam splitter 156 from opposite sides, one direction being a mirror image of the other, their electric vectors will add vectorially according to their relative optical phases. They may proceed in their original direction as two beams, dividing up the energy such that the intensity of one beam is proportional to the square of the sine of their relative phases and the other beam is proportional to the square of the cosine of their relative phases. Thus, adjustment of the relative phase can allow all of the light to proceed along direction 155. The relative phase of the two beams can be adjusted by setting the displacement of the pixels mirrors of one of the SLMs.

The two equal intensity beams are directed on to beam deflectors on SLMs 3 and 4 where they are deflected onto coincident regions of beam splitter 162. As discussed above, the relative phase of the beams is controlled so when they interfere on 162 all of the light is directed to outport 168. This configuration allows the use of lensed pixels without having output ports and input ports occupy the same areas.

Figure 12:
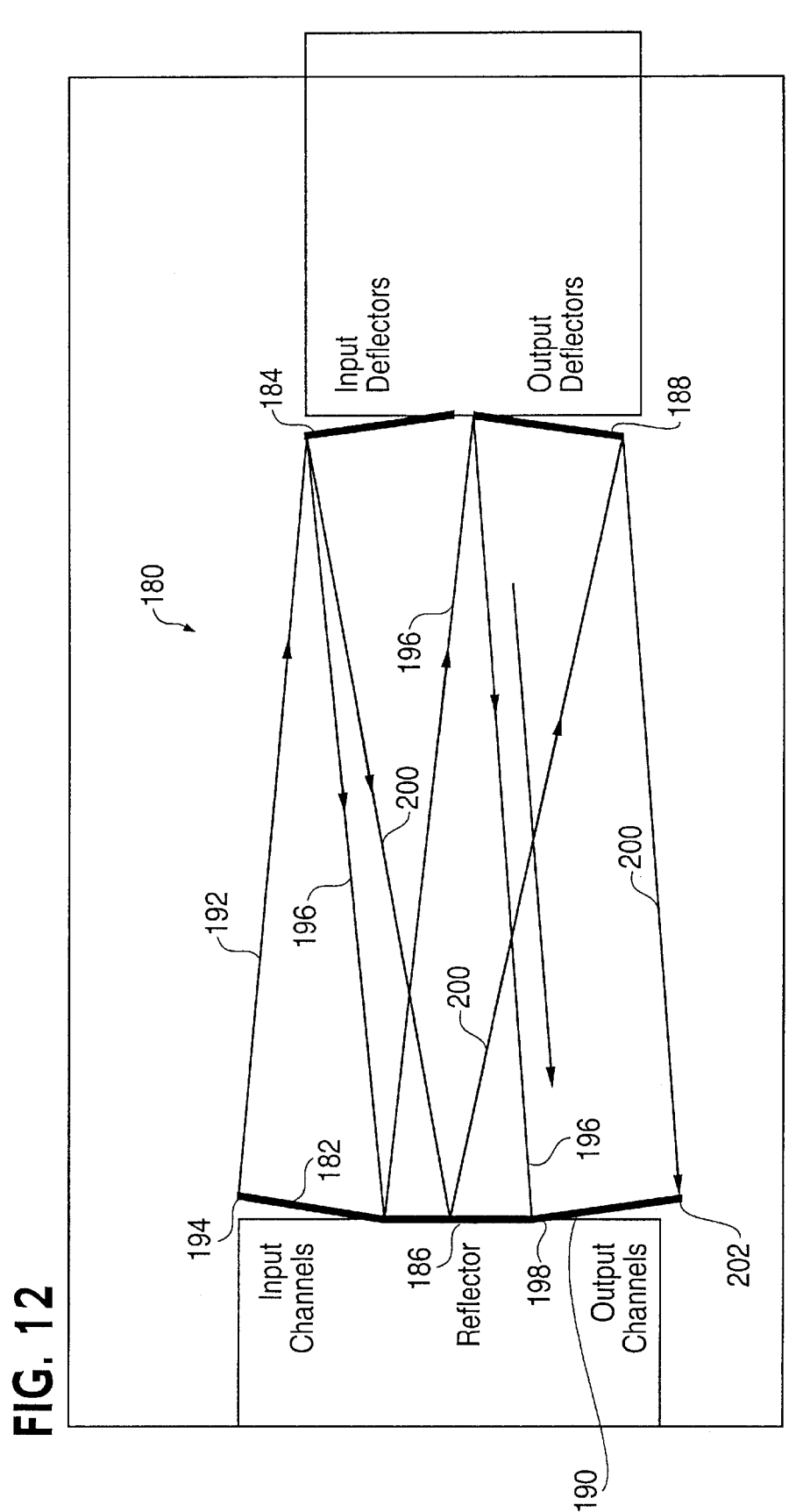

A cross connect configuration and a configuration which can function as a multiple channel router includes a cavity 180 depicted in cross section in FIG. 12. The cavity 180 includes a two dimensional array 182 of input channels or beams which are deflected by a two dimensional input deflector array 184 (SLM) onto a mirror 186. Each of the input beams is preferably collimated so that it can traverse the whole path through the switch maintaining essentially the same diameter. Each beam is directed onto a different pre-assigned deflection region on the "input deflector" plane. The mirror 186 reflects the beams onto an output deflector 188 (SLM) where the beams are deflected onto an output channel array 190. This figure also depicts the steering of an input beam 192 from an input fiber location 194 over a path 196 to a first output fiber position 198 and the steering of the beam 192 over a different path 200 to a second output fiber position 202. Within each deflection area (pixel array) on the input SLM 184 (or SLMs as needed) the pixel phase delays are adjusted to impart the phase delay appropriate to direct the incident beam to a desired deflection area on the output deflector plane including the output SLM 188 (or SLMs as needed), which is populated by a similar array of pixels divided into beam deflecting areas. In addition to deflecting the beam the deflecting region will refocus the beam by appropriate phase adjustment of the pixel mirrors.

Figure 13:
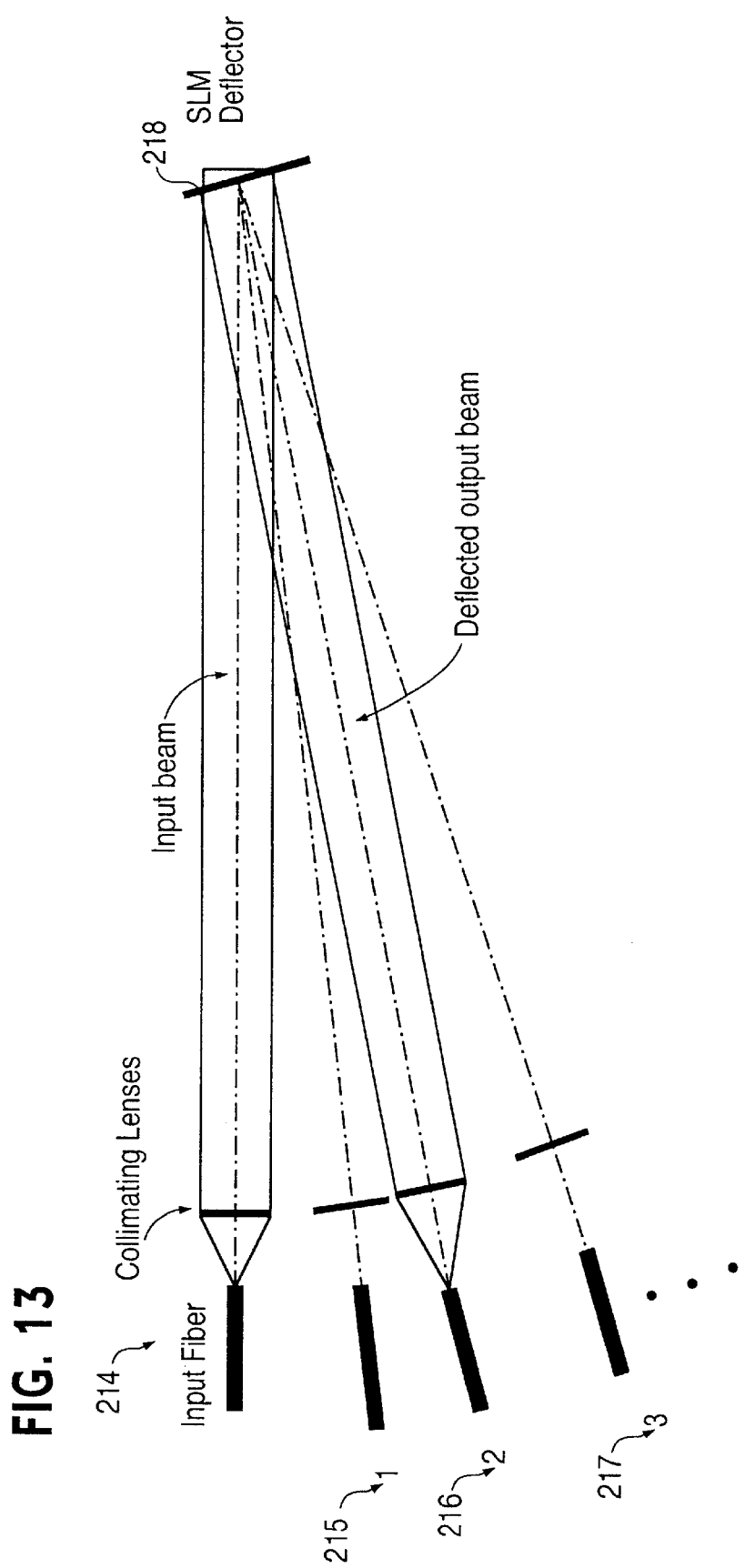

FIG. 13 depicts an embodiment which is particularly suitable for a router. This embodiment includes an input port 214 and multiple output ports 215, 216 and 217. This switch also has single deflector 218 which can be on the axes of both the input port and all of the output ports. One input port and three output ports are shown, however, additional output ports are possible as discussed below. The deflector 218 is, like other embodiments, a phase SLM array of pixels which can include a micro lens array, having one lens per pixel as in FIG. 6A or be without the lenses as in FIG. 6B. Only one deflecting region is necessary. The array of output ports can be duplicated in the dimension perpendicular to the drawing allowing a greater number of output ports. Alternatively the view shown can be duplicated in n parallel planes allowing for n input ports. Other applications of the same device are possible such as any of the n ports can be used as inputs that can be sequentially switched to any other port.

Figure 14:
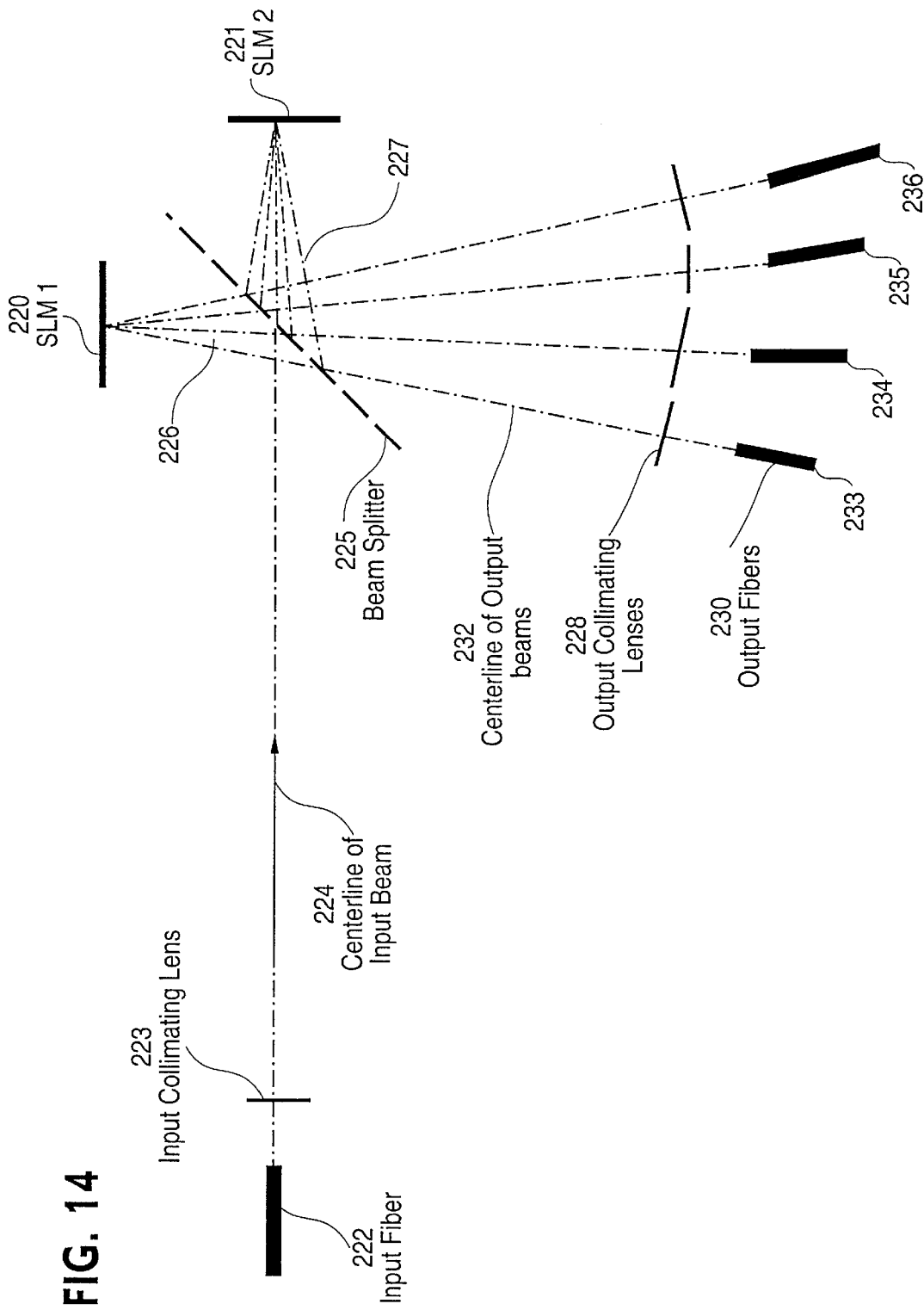

FIG. 14 shows the optical configuration for a router that uses two SLMs 220 and 221 in a Michelson interferometer configuration. It combines features of FIG. 11 and FIG. 13. Light from input fiber 222 is collimated by lens 223 to form an input beam 224 which is input to a Michelson Interferometer formed from beam splitter 225, SLM 1 (220) and SLM 2 (221). The input beam 224 is split into two equal intensity beams by beam splitter 225 incident on SLM 1 and SLM 2, respectively. These SLMs are phase SLMs as previously described except they are made up of an n×n array of pixels, comprising a single deflector. The pixels may have bare reflectors or be lensed pixels, as previously described.

The light beams incident on deflector SLMs 1 (220) and 2 (221) are deflected respectively into directions 226 and 227, where they interfere on beam splitter 225 and are directed through one of the output collimating lenses 228 to the output optical fibers 230 as output beams 232. The relative phases of pixels of the output beams can be adjusted by the phase shifting mirrors of the SLMs so that all of the light of the output beam is directed to, for example, output fiber 233. Changing the deflection angles while maintaining the same relative phases between the beams will allow the output to be directed to outputs fibers 234, 236 or 236. The light beam can also be deflected into a dimension perpendicular to the plane of the figure. The order of n×m output ports can be addressed using an array of n×m pixels having reflectors n×m wavelengths in size.

Figure 15:
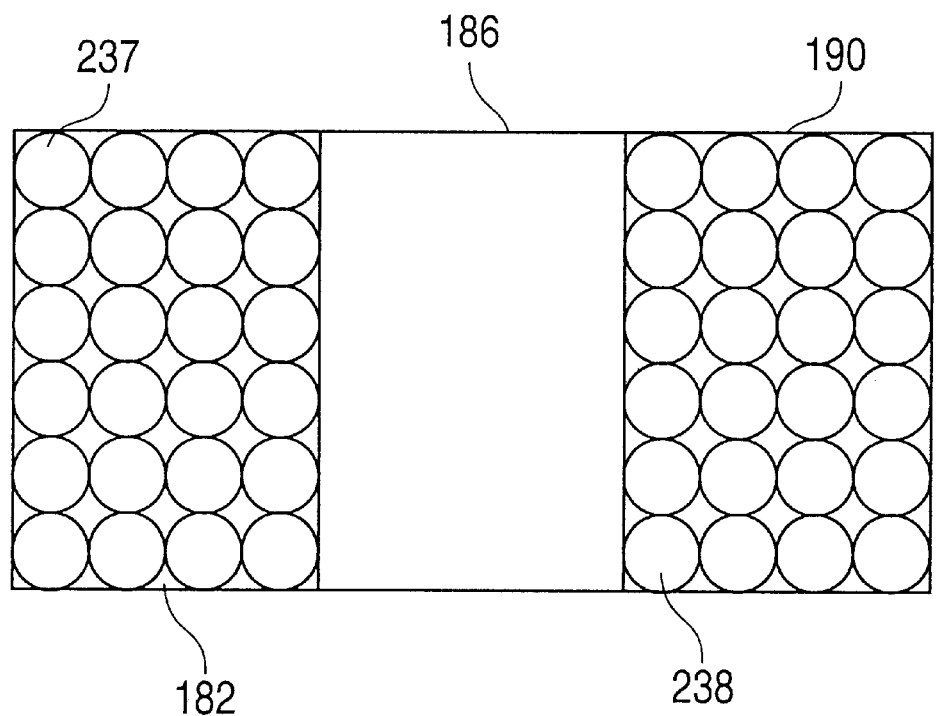
FIG. 15 depicts input and output deflector arrays.

Because of the limited ability of the beam deflectors (pixel deflection areas or pixel arrays) to steer each beam, the configuration of the input, output and deflector arrays can have rectangular type shape as shown in FIG. 15 for embodiments such as that of FIG. 12. In such a situation the path with the greatest deflection is between input fiber 237 and output fiber 238. The arrangement of the input and output channels in a two dimensional array is advantageous in that in such arrays the deflectors move into position to connect each input channel individually to any output channel The two dimensional input and output configuration of the present invention can also be more compact for a large number of channels that other devices. The packing of the pixels on an array can be hexagonal.

In the configurations shown in FIGS. 8–12, any input channel of the switch may also be an output channel.

The multi-channel inputs and outputs are arranged in essentially two-dimensional planar arrays as indicated in FIG. 12. The input deflector plane 184 and output deflector plane 188 are SLMs. If the input and output each have N channels, each SLM is divided into N contiguous close packed arrays of pixels 112, called beam deflectors, such as the hexagon depicted in FIG. 7. The pixels may, of course, be arranged in a rectangular grid or other convenient pattern. For convenience, we will consider a square rectangular grid. Note that a rectangular array of pixels of an SLM as depicted in FIGS. 5A and 5B would be grouped into deflector areas or regions and the pixels within such designated areas are deflection adjusted together and will together deflect the beam from a single channel.

Each input beam requires a deflector, which is located on the axis of the input beam. Similarly each output beam is reflected from a deflector that is on the axis of the output beam. Since we are using diffraction limited beams and single mode fibers this alignment needs to be accurate. Thus, there is a symmetry between input and output optics as shown in several of the figures where each input deflector deflects its beam to the output deflector assigned to the desired output channel. That output deflector deflects the beam to its assigned output position. Note that stray light from areas other than the assigned output deflector will not be able to enter the single mode fiber core. Thus, the effects of stray light are diminished.

Note that because of symmetry between the input optics and the output optics any single channel can be used either as an input or an output. The number of input channels need not be the same as the number of output channels. Further discussion here will assume an equal number of input channels and output channels.

For an n*m two dimensional array of input beams there will be an n*m two dimensional array of input deflectors and an n*m array of output deflectors. In order to maintain the diffraction limited beam diameter and be able to not have cross talk between beams, it is preferred that each deflector include approximately n*m pixels. Thus, there should be approximately $(n*m)^2$ pixels in each SLM.

The size or dimension, number of reflectors, etc. for each deflector needs to be determined. General design considerations that apply to a two dimensional SLM array optical switch design include the following considerations as discussed below.

The number of pixels per dimension ("n" above ) preferably equals or exceeds the number of beams in that same dimension ("m" above). This is preferred so that side lobes from one beam do not interfere with adjacent beams. A matching array of micro lenses, such as previously discussed, placed over the SLM, one per pixel, can increase the throughput efficiency and decrease stray light. The range of the wave front phase shift need only be a total of λ. Thus, the total motion required for the pixel mirrors is only λ/2, which for 1.55 micron light used in long distance fiber optic communication, is about 0.76 microns.

Pixel size has large impact on the design. The length of the switch and the SLM area both increased as the pixel width is squared. In the case of the SLM developed by MEMS Optical, Inc. the small reflector (or membrane) is displaced by varying an electric field between the reflector and the back plate. The speed of response can be less than $10^{-5}$ seconds for pixels of 20 microns diameter or smaller. The speed decreases for larger pixels.

Design of the electronic backplane imposes tradeoffs in optical design. The voltages or charge appropriate for each deflection can be stored in memory and accessed as needed. As is known in the operation of MEMS devices, controlling the voltage to cause deflection of a pixel mirror introduces instability in the mirror positioning. This is because, as the mirror moves closer to the back electrode in response to the electric force, the capacitance increases causing more charge to collect on the electrodes thus, further increasing the pulling force. To eliminate this instability the invention provides that charge may be placed onto the pixel electrodes by connecting them to a constant current source for a controlled time. The appropriate times to achieve the various useful deflections can be stored in memory. Symmetry characteristics of the array significantly reduce the number of individual deflection patterns that need be stored.

For a cross connect type switch only a few beams are typically switched during any switching period. Switching all channels of a very large array at the same time may put high data rate demands on an electronic backplane. The number of channels to be switched essentially simultaneously effects the number of input and output channels that a switch can handle.

Figure 16:
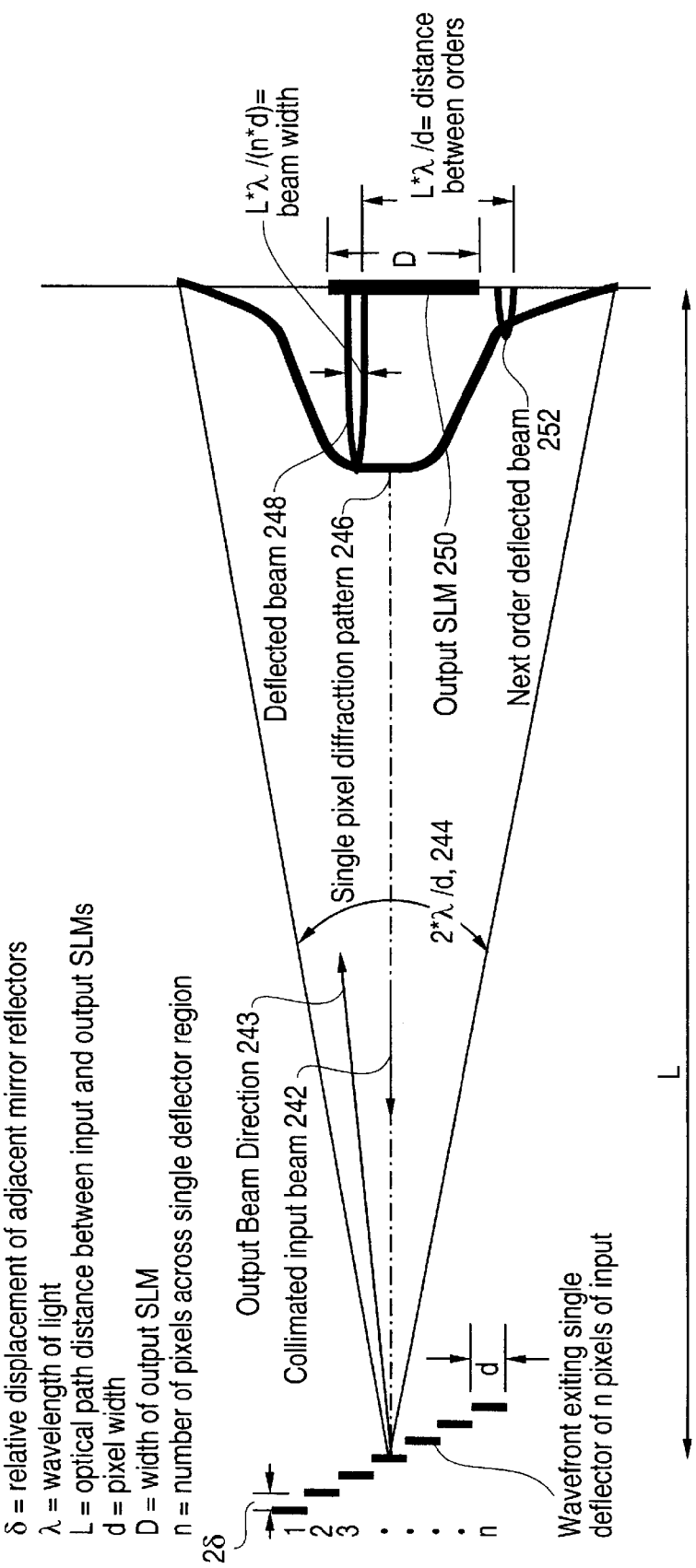
FIGS. 16 and 17 depict a relationship between beam characteristics and pixels.

FIG. 16 is a cross section schematic diagram, in which the direction of the collimated input beam is perpendicular to the deflector elements, i.e. parallel to the optic axis. The main features of the region of the switch between the input and the output SLMs are shown. The diagram is not to scale, however, it is useful in describing the geometric design parameters of the switch. The bare pixels are illuminated by a collimated beam of light 242 aimed essentially perpendicular to their surfaces. 243 is the direction of a wave front reflected by a group of n pixels comprising one deflector (region) for a single beam 248 (or 243). Light from an individual pixel spreads out by diffraction into angle $2*\lambda/d$, 244, giving rise to single pixel diffraction pattern 246. The interference of the coherent light from the n individual pixels gives rise to a deflected beam 248 of angular spread $\lambda/(n*d)$ that is incident on a single deflector region of the output SLM 250. The displacement of the deflected beam from the axis of the optical system is $2*\delta*L/d$. At a distance $L*\lambda/d$ from the main beam there is side lobe beam 252 caused by another order of interference. The number of pixels per deflector is preferred to be approximately as great as the number of beams in each of the two dimensions of the beam array so that adjacent beams do not interfere with each other.

Figure 17:
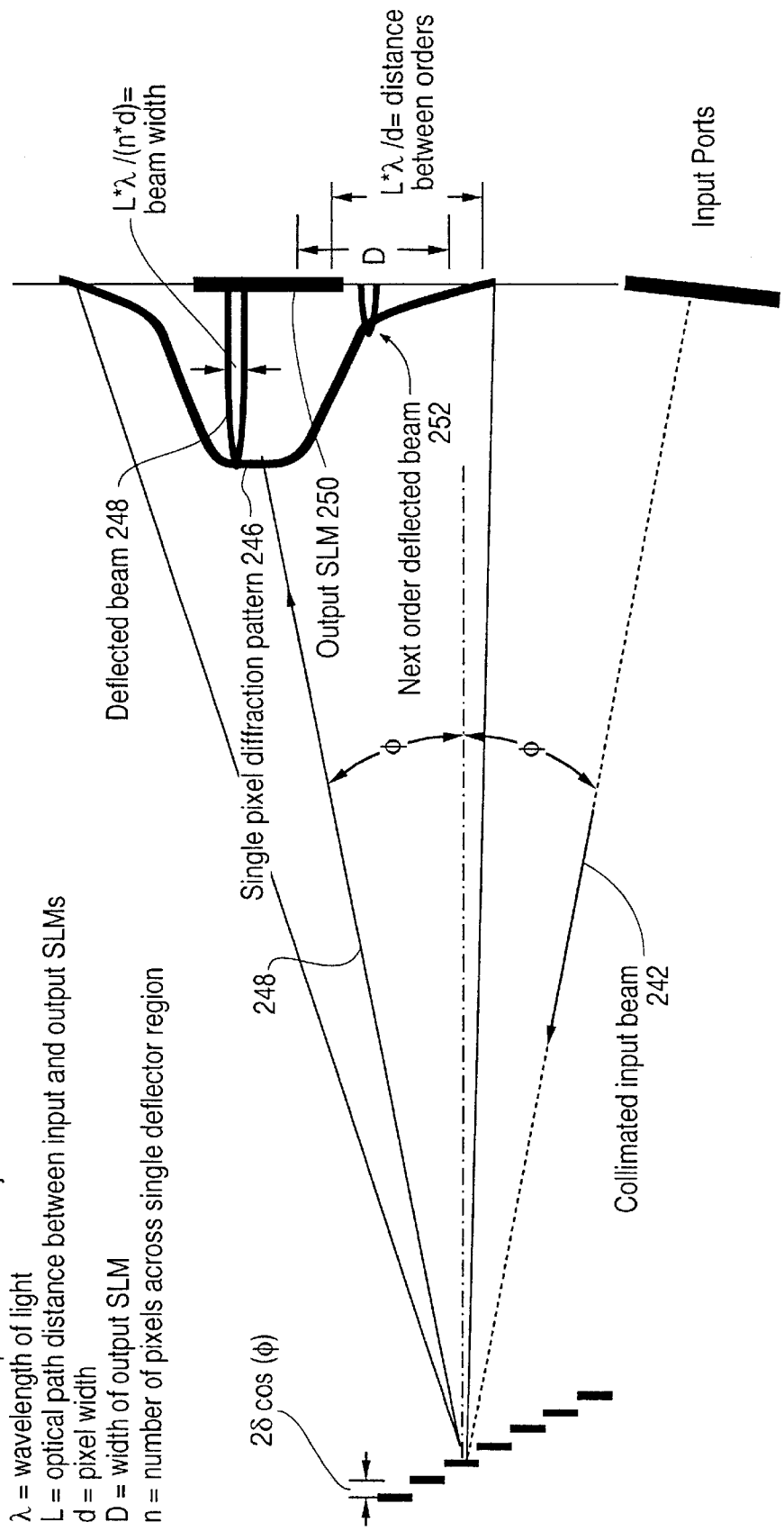

FIG. 17 shows an input beam incident on the bare pixel mirrors from an angle θ from below the perpendicular to the pixel mirror. The center of the single pixel diffraction pattern shifts to an angle θ above the axis as shown in the figure. Thus, the input array can be displaced from the region of the deflected beams. However, if individual lenses are used on each pixel as in FIG. 6A, the single pixel diffraction pattern may overlap the region of the input ports as in FIG. 16, decreasing the optical channel capacity of the switch. The use of a lens array with the pixels allows the use of smaller mirrors resulting in a faster switching operation than the use of bare mirrors with the same effective optical collection area.

Thus, lensed pixels offer an advantage for routers, in which very high switching speed is appropriate and in which the demand for total number of channels is less.

The Appendix contains a table of approximate switch dimensions for different pixel sizes, number of beams and number of pixels per beam for one dimension of the input array. The values given in the table are approximate, based on a simplified analysis. The actual practical values will be determined by more detailed optical design, as is practiced by persons knowledgeable in the art of optical system design, and by component cost. Similar calculations can be made for a two-dimensional array suitable for an optical router, switch or preferably an optical cross connect switch.

Figure 18:
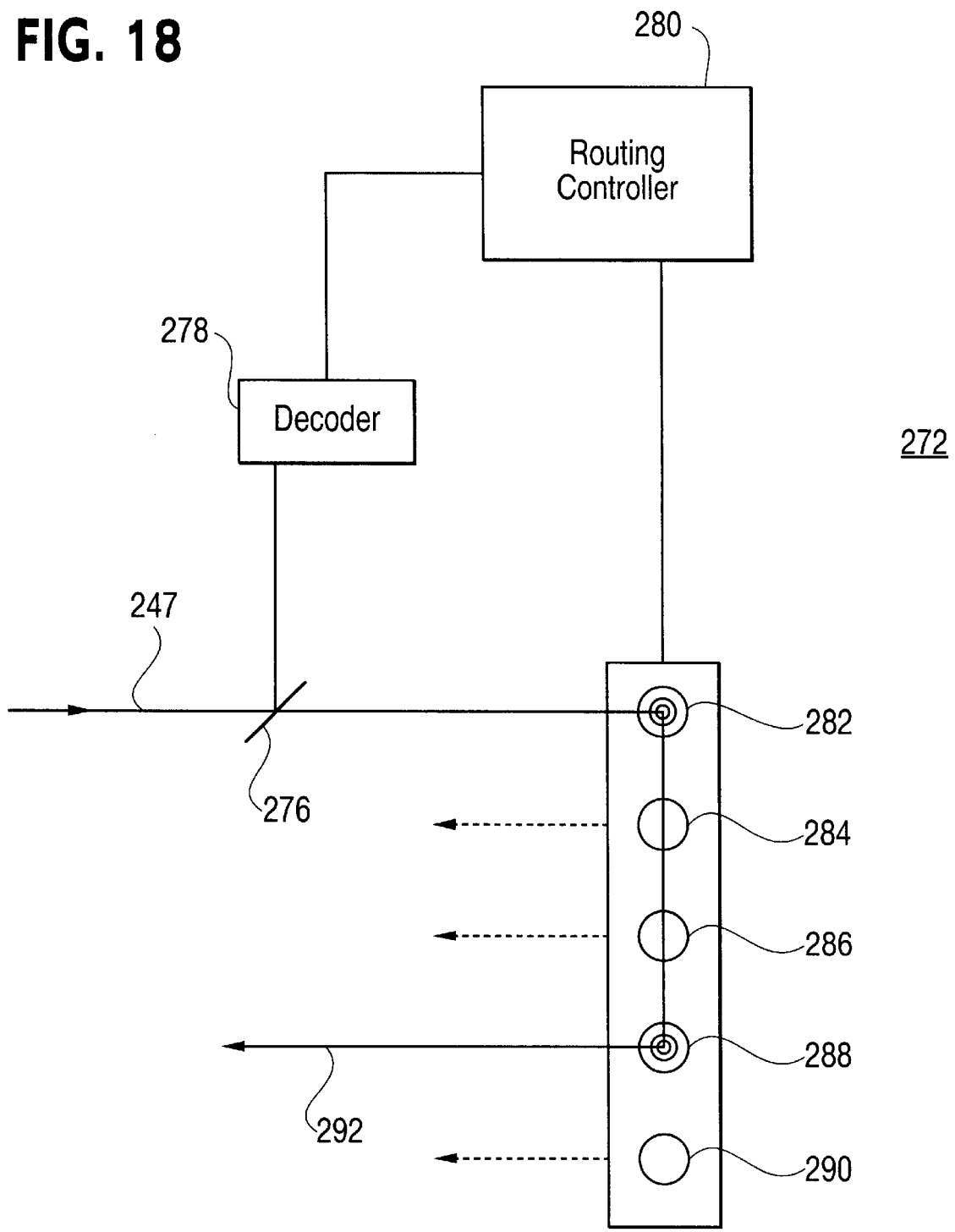
FIGS. 18 and 19 depict a packet router.
Figure 19:
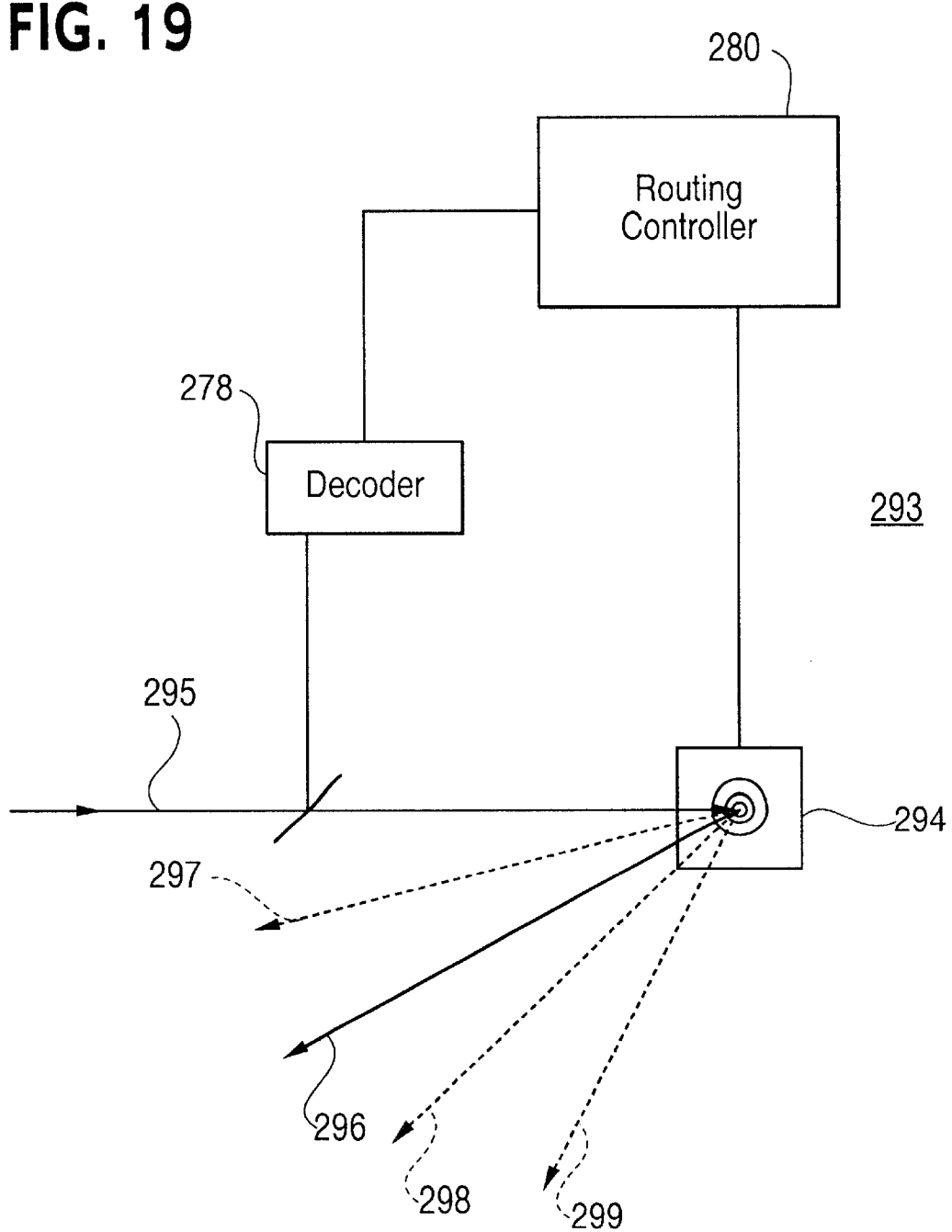

As previously noted the present invention is suitable for use as an optical router switch (see the block diagrams of FIGS. 18 and 19) and as an optical cross connect switch (see block diagram of FIG. 20).

A router switch 272 (see FIG. 18) includes an input beam 274 from an input optical fiber which is split by an optical beam splitter 276 and decoded by a routing address decoder 278. An address produced by the decoder 278 is supplied to a routing controller 280. The controller 280 produces pixel displacement values for the pixels of an input deflector region 282 which can be produced via table look-up or via hardwired encoding logic. The circular pattern of the deflector 282 is designed to indicate that the "shape" of the virtual reflecting surface of the deflector has been changed. The controller also selects an output channel or deflector region 288 from among plural output channels or deflector regions 284, 286, 288 and 290 to activate and the produces pixel displacement values for each of the pixels of the selected deflector 288. Because the beam from deflector 282 reaches only one of the deflectors 284–288 (in this example deflector 288), the output deflection values can be applied to all of the output deflectors since only the one that receives the beam will displace it further. This can also be determined by table look-up or hardwired logic. The output deflector 288 receives the input beam from the input deflector 282 via a mirror (not shown) and produces an output beam 292 transmitted by an outgoing optical fiber.

A router switch 293 (see FIG. 19) can also have a configuration which essentially uses a single deflector 294 (such as in FIGS. 13 and 14) to deflect an input beam 295 to one of several output positions such as an output beam 296 among output beam positions 296, 297, 298 and 299.

A cross connect switch 312 (see FIG. 20) receives a switching configuration signal from a configuration controller (not shown) which determines a switch configuration responsive to network conditions such as fiber availability/failure. A connection controller 314, responsive to the configuration signal, selects appropriate deflectors 316, 318 and 320 of an input array 322 to activate and produces deflection values for the pixels of the selected deflectors 316, 318 and 320. The deflectors receive input beams 324, 326 and 328 and deflect the beam via a mirror (not shown) to an output deflector array 330. At the same time, the controller 314 also selects deflectors 332, 334 and 336 of the output array 330 and produces deflection values for the pixels of the selected deflectors 332, 334 and 336 of the array 330. The beams from the input array 322 are deflected as corresponding output beams 338, 340 and 400. The switch configuration of FIG. 13 can also be used as an optical router.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

APPENDIX
Switch examples: calculations for one dimension input arrays
Calculation for optical path between input port plane and output port plane
Input data entries underlined. Wavelength assumed to be 1.55 um

| pixel size d | diffraction half angle of pixel | Pixel/ beam | No of beams | input array width (cm) | apodized beam width | diff angle of beam | beam Fresnel length (cm) | unfolded length in Fresnel lengths | distance between orders (cm) | diffraction spot size must < H | 1-D deflection needed | (Want < 1) max adjacent phase shift range including +&- wavelengths) | pixels per dim | # of channels in 2-D array |
|---|---|---|---|---|---|---|---|---|---|---|---|---|---|---|
| 5 | 0.300 | 25 | 20 | 0.25 | 125 | 0.0120 | 1.04 | 1.0 | 0.313 | 125 | 0.240 | 0.800 | 500 | 400 |
| 5 | 0.300 | 25 | 25 | 0.31 | 125 | 0.0120 | 1.04 | 1.0 | 0.313 | 125 | 0.300 | 1.000 | 625 | 625 |
| 5 | 0.300 | 40 | 30 | 0.60 | 200 | 0.0075 | 2.67 | 1.0 | 0.800 | 200 | 0.225 | 0.750 | 1200 | 900 |
| 5 | 0.300 | 40 | 40 | 0.80 | 200 | 0.0075 | 2.67 | 1.0 | 0.800 | 200 | 0.300 | 1.000 | 1600 | 1600 |
| 5 | 0.300 | 60 | 60 | 1.80 | 300 | 0.0050 | 6.00 | 1.0 | 1.800 | 300 | 0.300 | 1.000 | 3600 | 3600 |
| 10 | 0.150 | 25 | 20 | 0.50 | 250 | 0.0060 | 4.17 | 1.0 | 0.625 | 250 | 0.120 | 0.800 | 500 | 400 |
| 10 | 0.150 | 25 | 25 | 0.63 | 250 | 0.0060 | 4.17 | 1.0 | 0.625 | 250 | 0.150 | 1.000 | 625 | 625 |
| 10 | 0.150 | 40 | 30 | 1.20 | 400 | 0.0038 | 10.67 | 1.0 | 1.600 | 400 | 0.113 | 0.750 | 1200 | 900 |
| 10 | 0.150 | 40 | 40 | 1.60 | 400 | 0.0038 | 10.67 | 1.0 | 1.600 | 400 | 0.150 | 1.000 | 1600 | 1600 |
| 10 | 0.150 | 60 | 50 | 3.00 | 600 | 0.0025 | 24.00 | 1.0 | 3.600 | 600 | 0.125 | 0.833 | 3000 | 2500 |
| 10 | 0.150 | 80 | 70 | 5.60 | 800 | 0.0019 | 42.67 | 1.0 | 6.400 | 800 | 0.131 | 0.875 | 5600 | 4900 |
| 15 | 0.100 | 80 | 70 | 8.40 | 1200 | 0.0013 | 96.00 | 1.0 | 9.600 | 1200 | 0.088 | 0.875 | 5600 | 4900 |
| 20 | 0.075 | 25 | 20 | 1.00 | 500 | 0.0030 | 16.67 | 1.0 | 1.250 | 500 | 0.060 | 0.800 | 500 | 400 |
| 20 | 0.075 | 25 | 25 | 1.25 | 500 | 0.0030 | 16.67 | 1.0 | 1.250 | 500 | 0.075 | 1.000 | 625 | 625 |
| 20 | 0.075 | 40 | 30 | 2.40 | 800 | 0.0019 | 42.67 | 1.0 | 3.200 | 800 | 0.056 | 0.750 | 1200 | 900 |
| 20 | 0.075 | 40 | 40 | 3.20 | 800 | 0.0019 | 42.67 | 1.0 | 3.200 | 800 | 0.075 | 1.000 | 1600 | 1600 |
| 20 | 0.075 | 80 | 75 | 12.00 | 1600 | 0.0009 | 170.67 | 1.0 | 12.800 | 1600 | 0.070 | 0.938 | 6000 | 5625 |
| 30 | 0.050 | 25 | 20 | 1.50 | 750 | 0.0020 | 37.50 | 1.0 | 1.875 | 750 | 0.040 | 0.800 | 500 | 400 |
| 30 | 0.050 | 25 | 25 | 1.88 | 750 | 0.0020 | 37.50 | 1.0 | 1.875 | 750 | 0.050 | 1.000 | 625 | 625 |
| 30 | 0.050 | 40 | 30 | 3.60 | 1200 | 0.0013 | 96.00 | 1.0 | 4.800 | 1200 | 0.038 | 0.750 | 1200 | 900 |
| 30 | 0.050 | 40 | 40 | 4.80 | 1200 | 0.0013 | 96.00 | 1.0 | 4.800 | 1200 | 0.050 | 1.000 | 1600 | 1600 |
| 5 | 0.300 | 60 | 40 | 1.20 | 300 | 0.0050 | 6.00 | 1.0 | 1.800 | 300 | 0.200 | 0.667 | 2400 | 1600 |
| 30 | 0.050 | 80 | 60 | 14.40 | 2400 | 0.0006 | 384.00 | 1.0 | 19.200 | 2400 | 0.038 | 0.750 | 4800 | 3600 |
| 40 | 0.038 | 80 | 60 | 19.20 | 3200 | 0.0005 | 682.67 | 0.6 | 25.600 | 1920 | 0.047 | 1.250 | 4800 | 3600 |

What is claimed is:

1. An apparatus, comprising:
an optical switch changing a direction of a light beam by changing a phase of an optical wave front of the beam.

2. An apparatus, as recited in claim 1, wherein said switch comprises a spatial light modulator changing the direction of the beam.

3. An apparatus as recited in claim 2, wherein said modulator comprises a reflective phase spatial modulator having pixels grouped as a deflector region.

4. An apparatus as recited in claim 3, wherein each pixel comprises a spring held mirror having a position adjusted by a voltage.

5. An apparatus as recited in claim 4, wherein each pixel comprises a focusing lens.

6. An apparatus as recited in claim 5, wherein the mirror has an area substantially smaller than a size of the pixel.

7. An apparatus as recited in claim 4, wherein the mirror has an area substantially a size of the pixel.

8. An apparatus as recited in claim 3, wherein pixels are grouped into plural deflector regions.

9. An apparatus as recited in claim 8, wherein the deflector regions are contiguous.

10. An apparatus as recited in claim 8, wherein the deflector regions are separate.

11. An apparatus as recited in claim 3, wherein the beam is incident at an angle with respect to an axis of the deflector.

12. An apparatus as recited in claim 3, wherein the pixels are adjusted to form a virtual mirror.

13. An apparatus as recited in claim 1, wherein the phase of the wave front is changed in segments.

14. An apparatus as recited in claim 13, wherein the phase for each segment is modulo $\pi/2$.

15. An apparatus as recited in claim 1, wherein the beam is divided into pixels and each pixel comprises a spring held mirror having a position adjusted by a depositing a known charge upon mirror electrodes.

16. An apparatus as recited in claim 1, wherein the phase is additionally adjusted for divergence due to diffraction.

17. An optical switch, comprising:
an array of displaceable reflectors, each reflector displacing a portion of a wave front of an optical beam.

18. An optical switch as recited in claim 17, wherein the reflectors reflect the beam from an input port to one of plural output ports.

19. An optical switch as recited in claim 18, wherein the displaceable reflector are displaced relative to the adjoining deflector by a distance modulo($\lambda/2$).

20. An optical switch, comprising:
an input spatial light modulator deflecting an input beam producing an intermediate beam; and
an output spatial light modulator reflecting the intermediate beam as an output beam to one of two or more output ports.

21. An optical switch as recited in claim 20, further comprising a mirror in the optical path between the input spatial modulator and the output spatial modulator.

22. An optical switch, comprising:
   an input optical deflector deflecting an input optical beam producing an intermediate optical beam; and
   an output array of optical deflectors with one of the deflectors of the output array deflecting the intermediate beam producing an output beam with each of the optical deflectors comprising a spatial light modulator.

23. An optical switch as recited in claim 22, wherein the optical deflectors are phase SLMs comprising an array of reflecting mirrors inducing phase changes in the light beam by amounts of modulo($\lambda/2$).

24. An optical switch as recited in claim 22, further comprising a mirror reflecting the intermediate beam from the input deflector to the output deflector array.

25. An optical switch as recited in claim 22, further comprising:
   a beam decoder decoding a routing address of an input beam; and
   a routing controller controlling selection and deflection of the optical deflectors.

26. An optical switch, comprising:
   an input array of optical deflectors deflecting the input optical beams producing intermediate optical beams; and
   an output array of optical deflectors with the deflectors of the output array deflecting the intermediate beams producing output beams with each of the optical deflectors comprising a spatial light modulator.

27. An optical switch as recited in claim 26, wherein the optical deflectors are phase SLMs comprising an array of reflecting mirrors inducing phase changes in the light beam by amounts of modulo($\lambda/2$).

28. An optical switch as recited in claim 27, further comprising a connect controller controlling selection and deflection of the optical deflectors.

29. An optical switch as recited in claim 28, wherein the deflection includes a phase adjustment for divergence due to diffraction.

30. An optical switch as recited in claim 27, further comprising a mirror reflecting the intermediate beam from the input deflector to the output deflector array.

31. An optical switch as recited in claim 26, further comprising:
   a first field lens focusing the input optical beams; and
   a second field lens focusing the intermediate optical beams.

32. An apparatus, comprising:
   an optical switch changing a direction of a light beam by changing a phase of an optical wave front of the beam using a phase spatial light modulator where the beam is divided into pixels and each pixel of the modulator comprises a focusing lense and spring held mirror having a position adjusted by a depositing a known charge upon the mirror, the phase of the wave front is changed in segments where the phase for each segment is responsive to an integral number of light beam wavelengths and additionally adjusted for beam divergence; and
   a controller controlling the direction responsive to a routing address.

33. A method, comprising:
   optically switching a light beam by changing a phase of a wave front of the beam using a spatial light modulator.

34. A method as recited in claim 33, wherein the switching switches multiple input light beams to multiple output ports by switching the light beams using pixelated spatial light modulators in which the phase of no part of the wave is changed more than one wavelength of light.

35. A method as recited in claim 33, wherein the phase of no part of the wave is changed more than three wavelengths of light.

36. An optical switch receiving a single input beam and producing of output beams and comprising two spatial light modulators configured in a Michelson interferometer to receive the single input beam and produce of output beams.

37. An optical switch receiving input beams and producing output beams and comprising four phase optical light modulators configured in pairs into two Michelson Interferometers receiving the input beams and producing the output beams.

38. An optical switch, comprising:
   a optical beam splitter having an input side and splinting an input optical beam into two equal intensity beams; and
   a pair of spatial light modulators deflecting the equal intensity beams back to a same area of the beam splitter with relative phase such that all of the light intensity exits from an output side opposite the side of the beam splitter from the input side where the modulators deflect the input optical beam into one of plural output beam positions.

39. An optical switch, comprising:
   a Michelson interferometer having a pair of spatial light modulators deflecting an input optical beam to one of plural output beam positions.

40. An optical switch, comprising:
   a pair of Michelson interferometers, each interferometer having a pair of spatial light modulators deflecting an input optical beam to one of plural output beam positions.

* * * * *

UNITED STATES PATENT AND TRADEMARK OFFICE
CERTIFICATE OF CORRECTION

PATENT NO. : 6,430,328 B1
DATED : August 6, 2002
INVENTOR(S) : William H. Culver et al.

It is certified that error appears in the above-identified patent and that said Letters Patent is hereby corrected as shown below:

Column 11,
Lines 40-42, delete entire claim 1.

Column 12,
Line 43, delete "15." and insert -- 1. --.
Line 43, after "apparatus" delete "as recited in claim 1" and insert -- comprising: an optical switch changing a direction of a light beam by changing a phase of an optical wave front of the beam, --.
Line 45, after "by" delete "a".
Line 47, delete "16" and insert -- 15 --.
Line 57, after "displaceable" delete "reflector" and insert -- reflectors --.
Line 58, delete "deflector" and insert -- reflector --.
Line 60, after "modulator" delete "deflecting" and insert -- reflecting --.

Column 14,
Line 47, delete "40" and insert -- 16 --.

Signed and Sealed this

Twenty-fifth Day of February, 2003

JAMES E. ROGAN
*Director of the United States Patent and Trademark Office*